2,609,169

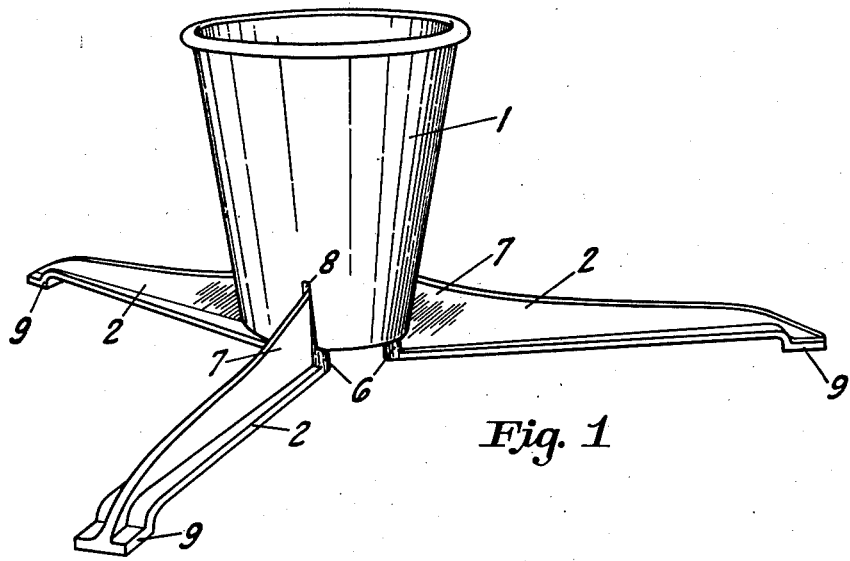
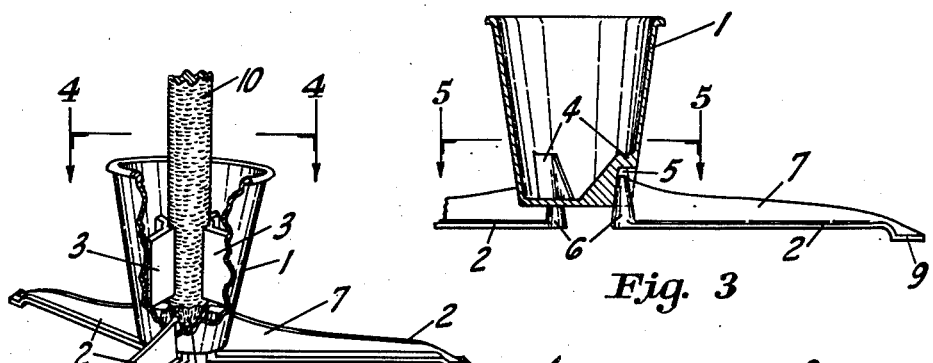
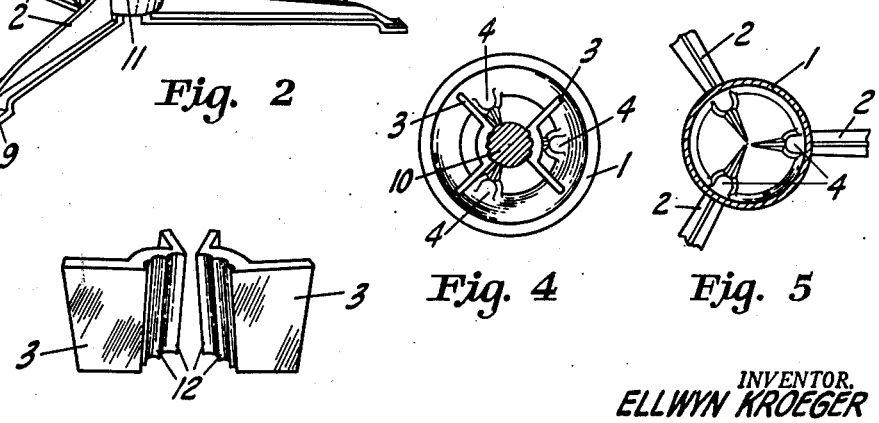
Fig. 1
Fig. 2
Fig. 3
Fig. 4
Fig. 5
Fig. 6
INVENTOR.
ELLWYN KROEGER Patented Sept. 2, 1952

UNITED STATES PATENT OFFICE 2,609,169

TREE SUPPORT

Ellwyn Kroeger, Le Claire, Iowa

Application December 23, 1947, Serial No. 793,417

3 Claims. (Cl. 248—48)

My present invention relates to tree supports, and more particularly to supports for Christmas trees, especially supports in which water may be placed to keep the tree from unduly drying out and dropping its leaves. Among the objects of my invention are the provision of a tree support of the type indicated which will have a sufficiently wide base to give the tree great stability; the provision of a support of the type indicated which is provided with means for preventing the tree from leaning in the support from one side to the other; the provision of a tree support of the type indicated which can be disassembled and put into a compact form for storage or shipment; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 is a perspective view of a tree support constructed in accordance with my invention;

Fig. 2 is a similar view on a smaller scale with a portion of the support broken away to show the interior arrangement thereof and with the base portion of a tree installed in place in the support;

Fig. 3 is a fragmentary longitudinal central section of a tree support in accordance with my invention;

Fig. 4 is a plan view of the structure shown in Fig. 2, with the tree shown in section, the section being taken substantially along the plane indicated by the line 4—4, Fig. 2;

Fig. 5 represents a fragmentary section substantially along the plane indicated by the line 5—5, Fig. 3; and Fig. 6 is a perspective view of the tree blocks which are placed inside of the cup for steadying the tree and holding it against tipping in the cup.

This tree support comprises a cup 1, a plurality of legs 2 and steadying blocks 3. The cup 1 has lugs 4 formed on the inside thereof, which lugs have tapered openings 5 therein for the reception of the correspondingly tapered heads 6 which are adapted to slide into and fit in the openings 5. The legs 2 have strengthening ribs 7 connecting the heads 6 with the bodies of the legs. Slots 8 are formed in the bottom of the cup and connect the openings 5 with the exterior. These slots receive the ribs 7 and help to steady the legs. At their outer ends, these legs have feet 9 which project downwardly sufficiently to support the inner ends of the legs and the cup above the floor or other support on which the tree support may be resting.

The lugs 4 slant downwardly and inwardly, at their inner edges to form a kind of socket for the lower end of the tree 10 which is tapered at its lower end, as shown at 11. Corrugations 12 on the inner faces of the blocks 3 tend to hold the tree steady. It is clear that, when a tree support of this type is used, it is possible to pour sufficient water into the cup 1 to cover a considerable section of the lower end of the tree, and this will find its way upwardly to the branches and leaves, in the manner that sap moves upwardly, and it will therefore help to maintain the tree in prime condition for a longer period of time.

It is of course understood that the specific description of structure set forth above may be departed from without departing from the spirit of this invention as described herein and as defined in the appended claims.

Having now described my invention, I claim:

1. A tree support comprising a cup provided in its bottom with a plurality of inwardly extending lugs having outwardly facing openings for the reception of supporting legs, said lugs being formed on the inside of said cup adjacent the bottom thereof and having, in the interior of said cup, substantially radially inwardly facing edges that converge downwardly to engage and center the lower end of a tree carried in said cup, the openings in the lugs being inwardly tapered, and supporting legs having tapered end portions fitting in said openings.

2. In a tree support, a water-containing cup and legs for supporting said cup and maintaining it in upright position, said cup having in its bottom portion lugs for the reception of parts of said legs, the lugs having downwardly facing and tapered openings, and the legs having heads that are tapered corresponding to the taper of said leg-receiving openings, and said heads extending substantially at right angles to the legs, whereby the legs spread outwardly when the heads are forced upwardly into said downwardly facing tapering openings.

3. A support for detached trees comprising a cup for receiving and holding water and the cut end of the tree, lugs in the bottom of the cup on the interior thereof, said lugs having substantially radially inwardly facing edges that taper downwardly in converging relation and between which the lower end of the tree is received, the interior walls of the cup tapering downwardly in converging relation, bracing blocks received in the cup above the lugs and between the tree and the wall of the cup, said bracing blocks having outer edges tapered to correspond to the tapering of the inner walls of said cup and dimensioned so as to engage the walls of said cup and the lower portion of the tree above the lower end thereof that engages the tapered inwardly facing edges of said lugs, whereby the tree is securely held at upper and lower points in said cup, each of said lugs having an approximately downwardly facing tapered opening, and legs for supporting and steadying the tree and cup, each of the legs having a head tapered to fit snugly in the associated lug opening.

ELLWYN KROEGER.

REFERENCES CITED

The following references are of record in the file of this patent:

UNITED STATES PATENTS

| Number | Name | Date |
|---|---|---|
| 150,320 | Hills | Apr. 28, 1874 |
| 224,624 | Albrecht | Feb. 17, 1880 |
| 1,117,158 | Bernartz et al. | Nov. 17, 1914 |
| 1,421,398 | Burches | July 4, 1922 |
| 1,772,693 | Van Dorin | Aug. 12, 1930 |
| 1,997,870 | Merrill | Apr. 16, 1935 |